(12) United States Patent
Offenhaeuser et al.

(10) Patent No.: US 10,252,720 B2
(45) Date of Patent: Apr. 9, 2019

(54) METHOD AND DEVICE FOR OPERATING A MOTOR VEHICLE

(71) Applicant: Robert Bosch GmbH, Stuttgart (DE)

(72) Inventors: Andreas Offenhaeuser, Marbach Am Neckar (DE); Erik Lesser, Steinheim (DE); Martin Kieren, Marbach A. N. (DE); Nils Hagenlocher, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 36 days.

(21) Appl. No.: 15/347,774

(22) Filed: Nov. 9, 2016

(65) Prior Publication Data

US 2017/0151955 A1    Jun. 1, 2017

(30) Foreign Application Priority Data

Nov. 27, 2015    (DE) .......................... 10 2015 223 504

(51) Int. Cl.
*B60W 30/18* (2012.01)
*B60K 28/16* (2006.01)
(Continued)

(52) U.S. Cl.
CPC ....... *B60W 30/18136* (2013.01); *B60K 28/16* (2013.01); *B60W 30/188* (2013.01);
(Continued)

(58) Field of Classification Search
CPC ..... B60W 30/18136; B60W 2550/148; B60W 2710/0666; B60W 2710/105;
(Continued)

(56) References Cited

U.S. PATENT DOCUMENTS 4,942,859 A  *  7/1990  Morikawa ............. F02D 11/107
                                                    123/198 D
5,313,922 A  *  5/1994  Demel ..................... B60K 28/16
                                                         123/333
(Continued)

FOREIGN PATENT DOCUMENTS

DE    19827003 A1  *  12/1999  ........... B60K 28/165
JP    10037777 A   *   2/1998  ............. B60K 28/16
JP    2009251741 A  *  10/2009

OTHER PUBLICATIONS

Goryca, Jill E., "Force and moment plots from Pacejka 2002 Magic Formula tire model coefficients", U.S. Army TARDEC Technical Report No. 21187, 2010, 41 pages (Year: 2010).*

(Continued)

*Primary Examiner* — Behrang Badii
*Assistant Examiner* — David A Testardi
(74) *Attorney, Agent, or Firm* — Norton Rose Fulbright US LLP; Gerard Messina

(57) ABSTRACT

A method for operating a motor vehicle that has at least one driving engine which is operatively connected to at least one drive wheel and is controlled as a function of an accelerator-pedal position in order to generate a drive torque, an engine drag-torque control being carried out to avoid skidding of the drive wheel when the accelerator pedal is moved in the direction of a neutral position. It is provided that a maximum permissible engine drag torque is specified to the engine drag-torque control as a function of a currently effective coefficient of friction of the road surface which is determined as a function of a present position of the motor vehicle.

25 Claims, 2 Drawing Sheets

(51) Int. Cl.
*B60W 30/188* (2012.01)
*B60W 40/068* (2012.01)

(52) U.S. Cl.
CPC .......... *B60W 30/18072* (2013.01); *B60W 30/18172* (2013.01); *B60W 40/068* (2013.01); *B60W 2030/18081* (2013.01); *B60W 2510/0604* (2013.01); *B60W 2550/148* (2013.01); *B60W 2550/402* (2013.01)

(58) Field of Classification Search
CPC ..... B60W 30/18072; B60W 30/18172; B60W 40/068; B60K 28/16; F02D 13/04; F02D 41/12; B60T 2201/09
See application file for complete search history.

(56) References Cited

U.S. PATENT DOCUMENTS

| | | | | | |
|---|---|---|---|---|---|
| 5,351,779 | A | * | 10/1994 | Yamashita | B60K 28/16 180/197 |
| 5,445,125 | A | * | 8/1995 | Allen | B60K 28/16 123/399 |
| 5,676,111 | A | * | 10/1997 | Zhang | B60K 28/16 123/325 |
| 5,927,421 | A | * | 7/1999 | Fukada | B60K 28/16 180/197 |
| 6,029,511 | A | * | 2/2000 | Welsch | B60K 28/165 180/338 |
| 6,161,641 | A | * | 12/2000 | Fukumura | B60K 28/16 180/197 |
| 6,330,504 | B1 | * | 12/2001 | Toukura | B60W 30/188 477/107 |
| 6,611,747 | B1 | * | 8/2003 | Schmitt | B60K 28/16 180/197 |
| 7,001,306 | B2 | * | 2/2006 | Suzuki | B60K 6/44 477/183 |
| 7,050,898 | B2 | * | 5/2006 | Ono | B60K 31/04 477/120 |
| 2003/0074124 | A1 | * | 4/2003 | Ono | B60K 31/04 701/70 |
| 2003/0221889 | A1 | * | 12/2003 | Sauter | B60K 28/16 180/197 |
| 2004/0117099 | A1 | * | 6/2004 | Inagaki | B60T 8/1755 701/70 |
| 2006/0142926 | A1 | * | 6/2006 | Yasui | F02D 41/1497 701/111 |
| 2007/0012499 | A1 | * | 1/2007 | Kobayashi | B60T 7/22 701/300 |
| 2008/0208427 | A1 | * | 8/2008 | Matsuno | B60T 8/1755 701/80 |
| 2009/0255743 | A1 | * | 10/2009 | Dilzer | B60K 6/48 180/65.265 |
| 2010/0245123 | A1 | * | 9/2010 | Prasad | B60T 8/175 340/870.41 |
| 2011/0125382 | A1 | * | 5/2011 | Bonfigt | B60T 8/175 701/71 |
| 2011/0136622 | A1 | * | 6/2011 | Enoki | B60W 10/02 477/83 |
| 2012/0283944 | A1 | * | 11/2012 | Haavasoja | G01C 21/32 701/411 |
| 2014/0025292 | A1 | * | 1/2014 | Stahlin | G01C 21/32 701/461 |
| 2015/0105959 | A1 | * | 4/2015 | Schnappauf | B60T 8/1755 701/22 |
| 2015/0135800 | A1 | * | 5/2015 | Israelsson | B60C 11/246 73/8 |
| 2016/0133131 | A1 | * | 5/2016 | Grimm | B60W 40/068 701/117 |
| 2016/0176408 | A1 | * | 6/2016 | Lynch | B60W 40/064 701/23 |
| 2016/0215832 | A1 | * | 7/2016 | Kuss | F16D 48/06 |

OTHER PUBLICATIONS

Wikipedia article, "Circle of forces", Old revision dated Sep. 24, 2013, 2 pages (Year: 2013).*

* cited by examiner

METHOD AND DEVICE FOR OPERATING A MOTOR VEHICLE

CROSS REFERENCE

The present application claims the benefit under 35 U.S.C. § 119 of German Patent Application No. DE 102015223504.1 filed on Nov. 27, 2015, which is expressly incorporated herein by reference in its entirety.

FIELD

The present invention relates to a method for operating a motor vehicle that has at least one driving engine which is operatively connected to at least one drive wheel and is controlled as a function of an accelerator-pedal position in order to generate a drive torque, an engine drag-torque control being carried out to avoid skidding of the drive wheel when the accelerator pedal is moved in the direction of a neutral position.

The present invention also relates to a device for implementing the method.

BACKGROUND INFORMATION

Driving engines of motor vehicles, thus, especially internal combustion engines and electric motors, generate a drag torque when the driver abruptly removes his foot from the accelerator pedal or when a coupling connecting the driving engine to the drive wheel engages quickly upon downshifting. Depending on how great the acting forces are in this instance, according to Kamm's circle, it may happen that the maximum force-transmission capability of the drive wheel between vehicle and roadway, especially the cornering force, is exceeded. Depending on the type of vehicle, construction of the driving engine and type of drive, the drag torque may therefore have a negative effect on the vehicle behavior. In the worst case, the drag torque may lead to skidding of the drive wheel, so that the motor vehicle becomes unstable.

To avoid this, conventionally, an engine drag-torque control is carried out when the driver takes his foot off the accelerator pedal or moves it to such an extent that the driving engine generates a drag torque. Usually, this control is part of the widely prevalent electronic stability program (ESP) and the traction control system (TCS). The engine drag-torque control prevents the drive wheel(s) from skidding, especially on a slippery roadway, by increasing the engine speed short-term, if necessary, in order to keep the vehicle stable and steerable.

Accordingly, a positive drive torque is predetermined for the driving engine, even though a drag torque is called for, in order to prevent the vehicle from becoming unstable. The condition of becoming unstable may be ascertained in conventional manner with the aid of the electronic stability program or the traction control system. For example, depending on the type of vehicle, a maximum engine drag torque is usually preset, which must not be exceeded in order to avoid skidding of the drive wheel(s).

SUMMARY

A method according to an example embodiment of the present invention may have the advantage that the engine drag-torque control is adapted to an instantaneous driving situation and roadway conditions, so that, for example, even in the case of different road surfacings, skidding of the drive wheel owing to a drag torque is reliably prevented, thus ensuring the directional stability of the motor vehicle on an ongoing basis. This is achieved according to the present invention by predetermining a maximum engine drag torque as a function of a currently effective coefficient of friction of the road surface, which is determined as a function of a present position of the motor vehicle. Thus, the invention provides that, depending on the present position of the motor vehicle, a coefficient of friction of the road surface is ascertained that has validity with respect to the present position. In this manner, the maximum engine drag torque is varied or predetermined as a function of the prevailing coefficient of friction of the road surface, so that even if the frictional coefficient of the road surface changes because of a property of the roadway, the stability of the operation of the motor vehicle is ensured.

Preferably, the position of the motor vehicle is determined by a satellite-based navigation system. This permits rapid and precise determination of position in an easy manner and, generally, without additional expenditure, because most motor vehicles are already equipped with a navigation system.

It is especially preferred that the navigation system is such that it also includes data with regard to the coefficient of friction of the routes or roadways. For example, this data is ascertained by previous efforts and stored in the database of the navigation system together with the position data. This makes it possible to determine or ascertain the prevailing coefficient of friction of the roadway in an especially easy manner.

In addition, the coefficient of friction is preferably requested wirelessly from a central database as a function of the position determined by the satellite-based navigation system. Consequently, in this context, the method makes use of two databases, on one hand, the database of the navigation system for determining position, and on the other hand, the external database in which coefficients of friction are stored for different positions, routes or roadways. Notably, the method may therefore also be carried out independently of the navigation system available. In particular, the coefficient of friction is requested wirelessly, preferably with the aid of a cellular telephone network.

Furthermore, preferably an activation threshold is set for the engine drag-torque control as a function of the coefficient of friction. Consequently, the sensitivity of the engine drag-torque control is influenced in advantageous manner, thus ensuring that in the case of expectedly lower coefficients of friction, the engine drag-torque control starts up or intervenes earlier than in the case of roadways with higher coefficients of friction.

In addition, preferably the maximum engine drag torque is specified to an engine management or an electronic stability program which controls or influences the driving engine. Consequently, the engine management itself or the control unit of an electronic stability program is used to implement the method according to the present invention. In the first case, an intervention takes place in the engine management, regardless of whether or not an electronic stability program detects skidding of a wheel. Thus, the maximum or maximum permissible drag torque is set independently of the actual handling performance of the motor vehicle. In the second case, the maximum engine drag torque is taken into account by the stability program, so that the drag torque of the driving engine is limited in response to a control by the stability program only when it is necessary.

According to one preferred further refinement of the invention, an effective coefficient of friction of the road surface is determined as a function of a handling performance of the motor vehicle. Especially with the aid of the electronic stability program or the traction control system, it is monitored whether the drive wheel is skidding or is transmitting a torque to the roadway. An effective coefficient of friction of the road surface is thereby ascertainable.

Furthermore, preferably the ascertained effective coefficient of friction of the road surface is transmitted, together with the present position of the motor vehicle, to the central database. The database is thereby updated with regard to the coefficient of friction at the specific position. In this manner, it is possible, for example, that the database is updated by a preceding vehicle to the effect that the coefficient of friction of the road surface has decreased, e.g., because of slipperiness or wetness, which is learned by the following vehicle through a further database query and taken into account in the drag-torque control. A communication with a cloud takes place, so to speak, by which instantaneous coefficients of friction of the road surface are able to be ascertained, updated, and used in the drag-torque control. Driving safety is thereby also increased for other motor vehicles in which the advantageous method is likewise used, therefore permitting optimization of the method overall.

In this context, it is provided, namely, that in addition to the effective coefficient of friction of the road surface, prevailing environmental data such as an ambient temperature, an atmospheric humidity and/or an atmospheric pressure are transmitted to the database, so that in response to a subsequent database query, a frictional coefficient of the road surface is ascertained not only as a function of a present vehicle position, but also as a function of prevailing environmental values, so that the drag-torque control is further optimized to the individual case.

A device in accordance with an example embodiment of the present invention is characterized by a specially adapted control unit, which implements the method according to the present invention when used as intended. The advantages already indicated are thereby obtained.

Further advantages and preferred features and feature combinations are derived especially from the description herein and the figures.

In the following, the present invention shall be explained in greater detail with reference to the figures.

DETAILED DESCRIPTION OF EXAMPLE EMBODIMENTS

Figure 1:
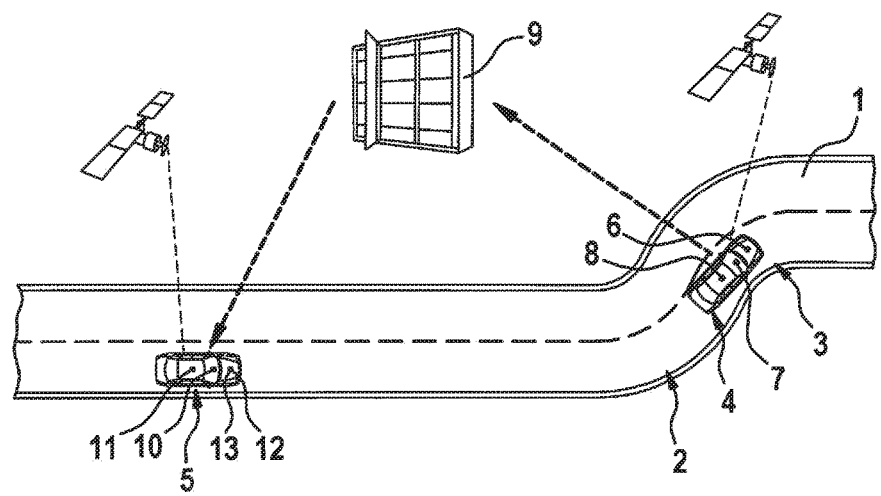
FIG. 1 shows a traffic situation in a simplified representation.

FIG. 1, in a simplified top view, shows a roadway 1 in the form of a street that has two curves 2, 3. On the street are two vehicles 4, 5, which are moving in the same direction on roadway 1. Vehicle 4, situated in front as viewed in the direction of travel, is located between curves 2 and 3. Vehicle 4 has an electronic stability program which, based on the speeds of the wheels of motor vehicle 4, detects a wheel slip and therefore skidding of individual wheels. From this wheel slip, a control unit of motor vehicle 4 determines an effective coefficient of friction of roadway 1. In addition, through a satellite-based navigation system 7, motor vehicle 4 continuously determines its instantaneous position on roadway 1. For example, if, on the basis of a skidding drive wheel, motor vehicle 4 ascertains an effective coefficient of friction of roadway 1 in first curve 2, it then transmits it by way of a radio device 8 to a central database 9, where the effective coefficient of friction is stored together with the present position of motor vehicle 4.

Following motor vehicle 5, which has not yet reached the curves, likewise has a satellite-based navigation system 10 as well as a radio module 11 for wireless communication with database 9. Motor vehicle 5 also has a control unit 12 for implementing an electronic stability program, as well as an engine control unit 13 that specifies a drive torque of a driving engine, especially an internal combustion engine, of motor vehicle 5, as a function of an accelerator-pedal position which is input by the driver of motor vehicle 5. If the driver removes his foot abruptly from the accelerator pedal, so that the accelerator pedal arrives back in its neutral position, engine control unit 13 controls the internal combustion engine in such a way that it enters into a trailing-throttle operation and sets a drag torque, thus, a drive torque acting negatively on the drive wheels of motor vehicle 5, resulting in deceleration of motor vehicle 5. In this context, a drag-torque control is carried out in which, as a function of a maximum permissible drag torque, internal combustion engine 13 is driven as needed to generate increased drive torque, in order to avoid exceeding the maximum permissible drag torque.

In this instance, the maximum or maximum permissible drag torque is predetermined as a function of a prevailing coefficient of friction of roadway 1, so as to ensure that upon setting the maximum permissible drive torque, none of the drive wheels, which are connected to the driving device, skids because of the negative drive torque. To that end, the present position of the motor vehicle is monitored continuously by navigation system 10 and data of central database 9 is queried with the aid of communication module 11 in order to request the prevailing coefficient of friction of roadway 1 for the present position of motor vehicle 5. Because this frictional coefficient was possibly determined anew by preceding motor vehicle 4 and stored in database 9, motor vehicle 5, or rather the control unit provided for it, receives the coefficient of friction of roadway 1 actually determined by motor vehicle 4, passed on as prevailing coefficient of friction. Because the coefficient of friction of the road surface may change depending on weather conditions, it is thereby ensured that motor vehicle 5 is always provided with the most up-to-date frictional coefficient, so that the maximum drag torque may be set in optimal fashion.

This method is explained in greater detail below with reference to FIGS. 2 through 5.

Figure 2:
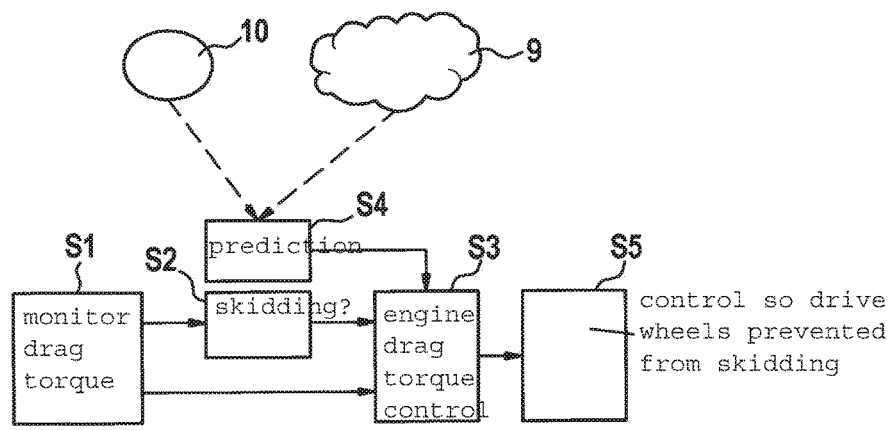
FIG. 2 shows an advantageous method for increasing directional stability according to a first exemplary embodiment.

FIG. 2 shows a first exemplary embodiment of the advantageous method in a simplified representation. As already described, in a first step S1, with the aid of the vehicle sensor system, especially as a function of a wheel speed and a vehicle longitudinal acceleration, an actual engine drag torque is and motor vehicle 5 is monitored for stability of handling performance. Particularly with the aid of a slip model, which is used in a step S2 to determine whether one of the drive wheels is skidding, in a step S3, an engine drag-torque control is carried out. In this context, a maximum permissible engine drag torque is predetermined by a prediction in a step S4. As a function of the present position and the routes of motor vehicle 5, the coefficient of friction prevailing at the position to be reached soon by motor vehicle 5 may be predicted, by the fact that the present position is determined by navigation system 10, and from that, the future position and the associated coefficient of friction of roadway 1 are determined from database 9. The maximum drag torque is specified to engine drag-torque control in step S3, which, as a function thereof, in step S5, controls the driving engine, particularly the internal combustion engine and alternatively or additionally, also an electric motor, so that the drive wheels are prevented from skidding.

Figure 3:
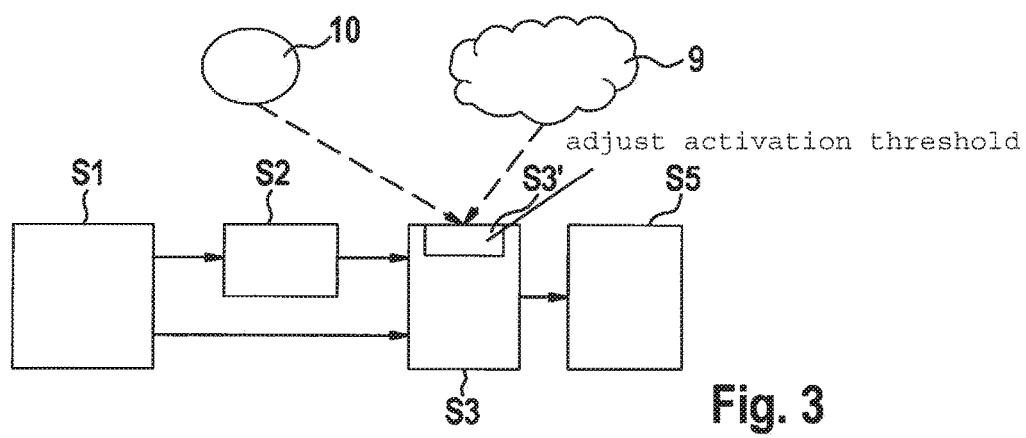
FIG. 3 shows the method according to a second exemplary embodiment.

FIG. 3 shows a further exemplary embodiment of the method, elements already known from the previous figures being provided with the same reference numerals, so that in this respect, reference is made to the description above. Primarily the differences shall be discussed in the following.

In contrast to the previous exemplary embodiment, the activation threshold of the engine drag-torque control in step S3 is adjusted in a pre-step S3' as a function of the prevailing coefficient of friction. As already described above, the prevailing coefficient of friction is determined especially as a function of the present position of the motor vehicle and the data, stored in database 9, which was possibly updated by preceding motor vehicles. Advantageously, the activation threshold is reduced if the prevailing coefficient of friction drops below a specifiable threshold, so that the engine drag-torque control intervenes early on in the operation of the motor vehicle. If the coefficient of friction exceeds a specifiable threshold, then the activation threshold is advantageously raised, so that the driver of the motor vehicle is able to make maximum use of the drag torque theoretically available.

Figure 4:
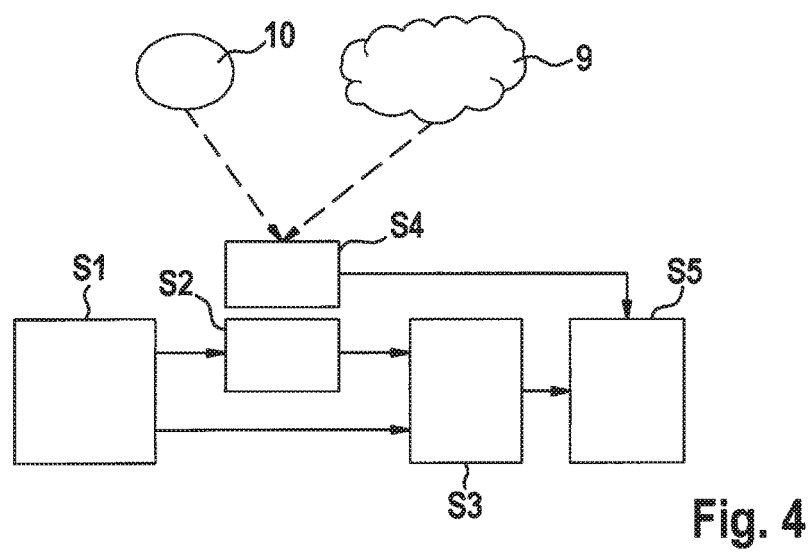
FIG. 4 shows the method according to a third exemplary embodiment.

The exemplary embodiment of FIG. 4 differs from the exemplary embodiment of FIG. 2 in that the engine drag-torque precontrol from step S4 does not make the maximum engine drag torque available to the engine drag-torque control in step S3, but rather to the engine management in step S5, so that an adjustment to the prevailing coefficient of friction is carried out not by the engine drag-torque control itself, but rather by the engine management, which limits the maximum drag torque of the driving engine independently of the intervention of the engine drag-torque control.

Figure 5:
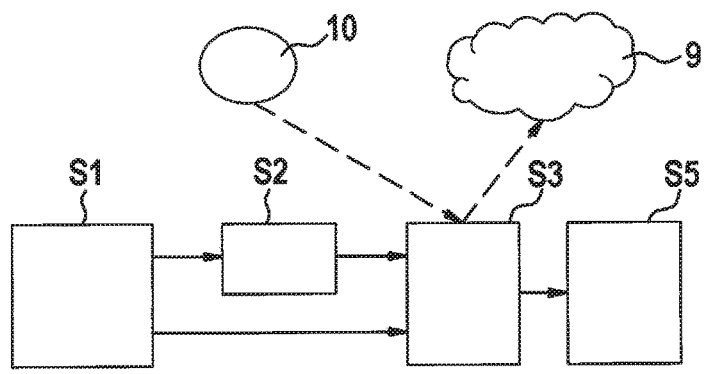
FIG. 5 shows the method according to a fourth exemplary embodiment.

FIG. 5 shows the method already described with reference to FIG. 1, in which, as a function of acquired wheel-slip data and a present position of the motor vehicle, an instantaneously determined coefficient of friction of the roadway is transmitted to database 9, in order to update the data stored there.

Owing to the advantageous method and its variants, a slipping or skidding drive wheel of the motor vehicle because of an excessive drag torque is safely avoided, thereby reliably ensuring the directional stability of motor vehicle 5.

What is claimed is:

1. A method for operating a motor vehicle that has at least one driving engine which is operatively connected to at least one drive wheel and is controlled as a function of an accelerator-pedal position to generate a drive torque, the method comprising:

detecting a wheel slip at another vehicle, which has an electronic stability program, based on the speeds of the wheels of the another vehicle;

determining, via a control unit of the another vehicle, an effective coefficient of friction of a roadway from the wheel slip;

continuously determining a present position of the another vehicle on the roadway through a satellite-based navigation system of the another vehicle;

transmitting the effective coefficient of friction of the another vehicle on the roadway to a central database, where the effective coefficient of friction of the another vehicle is stored together with the present position of the another vehicle;

carrying out, at the motor vehicle, an engine drag-torque control to avoid skidding of the drive wheel when the accelerator pedal arrives back in a neutral position; and specifying a maximum permissible engine drag torque to the engine drag-torque control as a function of a currently effective coefficient of friction, received from the central database and as determined by the another vehicle and stored in the central database, of a road surface that is determined as a function of a present position of the motor vehicle;

wherein the engine drag-torque control is adapted to an instantaneous driving situation and roadway condition, so that skidding of the drive wheel owing to a drag torque is prevented, and wherein with a vehicle sensor system, as a function of a wheel speed and a vehicle longitudinal acceleration, an actual engine drag torque is monitored, wherein a slip model is used to determine whether one of the drive wheels is skidding, wherein an engine drag-torque control is carried out, where the maximum permissible engine drag torque is predetermined.

2. The method as recited in claim 1, wherein the position of the motor vehicle is determined by a satellite-based navigation system.

3. The method as recited in claim 2, wherein the coefficient of friction is determined from data of the navigation system.

4. The method as recited in claim 1, wherein the coefficient of friction is requested wirelessly from the central database as a function of the present position of the motor vehicle.

5. The method as recited in claim 1, wherein an activation threshold is set for the engine drag-torque control as a function of the ascertained coefficient of friction.

6. The method as recited in claim 1, wherein the maximum permissible engine drag torque is specified to an engine management or an electronic stability program that controls the driving engine.

7. The method as recited in claim 1, wherein an effective coefficient of friction of the road surface is ascertained as a function of a handling performance of the motor vehicle.

8. The method as recited in claim 7, wherein the ascertained effective coefficient of friction of the road surface is transmitted, together with the present position of the motor vehicle, to the central database.

9. The method as recited in claim 8, wherein at least one prevailing environmental value is transmitted to the database.

10. A device for operating a motor vehicle that has at least one driving engine which is operatively connected to at least one drive wheel and is controlled as a function of an accelerator-pedal position to generate a drive torque, comprising:

a control unit configured to perform the following:
carrying out, at the motor vehicle, an engine drag-torque control to avoid skidding of the drive wheel when the accelerator pedal arrives back in a neutral position, wherein a wheel slip is determined at another vehicle, which has an electronic stability program, based on the speeds of the wheels of the another vehicle, wherein, via a control unit of the another vehicle, an effective coefficient of friction of a roadway from the wheel slip is determined, wherein a present position of the another vehicle on the roadway is continuously determined through a satellite-based navigation system of the another vehicle, wherein the effective coefficient of friction of the another vehicle on the roadway is transmitted to a central database, where the effective coefficient of friction of the another vehicle is stored together with the present position of the another vehicle; and specifying a maximum permissible engine drag torque to the engine drag-torque control as a function of a currently effective coefficient of friction, received from the central database and as determined by the another vehicle and stored in the central database, of a road surface that is determined as a function of a present position of the motor vehicle;

wherein the engine drag-torque control is adapted to an instantaneous driving situation and roadway condition, so that skidding of the drive wheel owing to a drag torque is prevented, and wherein with a vehicle sensor system, as a function of a wheel speed and a vehicle longitudinal acceleration, an actual engine drag torque is monitored, wherein a slip model is used to determine whether one of the drive wheels is skidding, wherein an engine drag-torque control is carried out, where the maximum permissible engine drag torque is predetermined.

11. The device as recited in claim 10, wherein an activation threshold of the engine drag-torque control is adjusted as a function of a prevailing coefficient of friction, which is determined as a function of the present position of the motor vehicle and the data, stored in the database, which is updated by preceding motor vehicles.

12. The device as recited in claim 10, wherein, as a function of the present position and routes of the motor vehicle, the coefficient of friction prevailing at the position to be reached by the motor vehicle is predicted, by the fact that the present position is determined by the navigation system, and from that, a future position and an associated coefficient of friction of the roadway are determined from the database, and wherein the maximum drag torque is specified to the engine drag-torque control, which controls the driving engine, so that the drive wheels are prevented from skidding.

13. The device as recited in claim 10, wherein the position of the motor vehicle is determined by a satellite-based navigation system.

14. The device as recited in claim 13, wherein the coefficient of friction is determined from data of the navigation system.

15. The device as recited in claim 10, wherein the coefficient of friction is requested wirelessly from the central database as a function of the present position of the motor vehicle.

16. The device as recited in claim 10, wherein an activation threshold is set for the engine drag-torque control as a function of the ascertained coefficient of friction.

17. The device as recited in claim 10, wherein the maximum permissible engine drag torque is specified to an engine management or an electronic stability program that controls the driving engine.

18. The device as recited in claim 10, wherein an effective coefficient of friction of the road surface is ascertained as a function of a handling performance of the motor vehicle.

19. The device as recited in claim 18, wherein the ascertained effective coefficient of friction of the road surface is transmitted, together with the present position of the motor vehicle, to the central database.

20. The device as recited in claim 19, wherein at least one prevailing environmental value is transmitted to the database.

21. The device as recited in claim 12, wherein the coefficient of friction is determined from data of a navigation system or the coefficient of friction is requested wirelessly from the central database as a function of the present position of the motor vehicle, wherein an activation threshold is set for the engine drag-torque control as a function of the ascertained coefficient of friction, and wherein the maximum permissible engine drag torque is specified to an engine management or an electronic stability program that controls the driving engine.

22. The device as recited in claim 21, wherein an effective coefficient of friction of the road surface is ascertained as a function of a handling performance of the motor vehicle, and wherein the ascertained effective coefficient of friction of the road surface is transmitted, together with the present position of the motor vehicle, to a central database.

23. The device as recited in claim 22, wherein at least one prevailing environmental value is transmitted to the database.

24. A device for operating a motor vehicle that has at least one driving engine which is operatively connected to at least one drive wheel and is controlled as a function of an accelerator-pedal position to generate a drive torque, comprising:

a control unit configured to perform the following:
carrying out, at the motor vehicle, an engine drag-torque control to avoid skidding of the drive wheel when the accelerator pedal arrives back in a neutral position, wherein a wheel slip is determined at another vehicle, which has an electronic stability program, based on the speeds of the wheels of the another vehicle, wherein, via a control unit of the another vehicle, an effective coefficient of friction of a roadway from the wheel slip is determined, wherein a present position of the another vehicle on the roadway is continuously determined through a satellite-based navigation system of the another vehicle, wherein the effective coefficient of friction of the another vehicle on the roadway is transmitted to a central database, where the effective coefficient of friction of the another vehicle is stored together with the present position of the another vehicle; and specifying a maximum permissible engine drag torque to the engine drag-torque control as a function of a currently effective coefficient of friction, received from the central database and as determined by the another vehicle and stored in the central database, of a road surface that is determined as a function of a present position of the motor vehicle;

wherein the engine drag-torque control is adapted to an instantaneous driving situation and roadway condition, so that skidding of the drive wheel owing to a drag torque is prevented, wherein an activation threshold of the engine drag-torque control is adjusted as a function of a prevailing coefficient of friction, which is determined as a function of the present position of the motor vehicle and the data, stored in the database, which is updated by preceding motor vehicles, and wherein the activation threshold is reduced if the prevailing coefficient of friction drops below a specifiable threshold, so that the engine drag-torque control intervenes in the operation of the motor vehicle, and wherein if the coefficient of friction exceeds a specifiable threshold, then the activation threshold is raised, so that the driver of the motor vehicle is able to use the drag torque.

25. A device for operating a motor vehicle that has at least one driving engine which is operatively connected to at least one drive wheel and is controlled as a function of an accelerator-pedal position to generate a drive torque, comprising:

a control unit configured to perform the following:

carrying out, at the motor vehicle, an engine drag-torque control to avoid skidding of the drive wheel when the accelerator pedal arrives back in a neutral position, wherein a wheel slip is determined at another vehicle, which has an electronic stability program, based on the speeds of the wheels of the another vehicle, wherein, via a control unit of the another vehicle, an effective coefficient of friction of a roadway from the wheel slip is determined, wherein a present position of the another vehicle on the roadway is continuously determined through a satellite-based navigation system of the another vehicle, wherein the effective coefficient of friction of the another vehicle on the roadway is transmitted to a central database, where the effective coefficient of friction of the another vehicle is stored together with the present position of the another vehicle; and specifying a maximum permissible engine drag torque to the engine drag-torque control as a function of a currently effective coefficient of friction, received from the central database and as determined by the another vehicle and stored in the central database, of a road surface that is determined as a function of a present position of the motor vehicle;

wherein the engine drag-torque control is adapted to an instantaneous driving situation and roadway condition, so that skidding of the drive wheel owing to a drag torque is prevented, and wherein an engine drag-torque precontrol does not make the maximum permissible engine drag torque available to the engine drag-torque control, but it is provided to an engine management program, so that an adjustment to the currently effective coefficient of friction is carried out not by the engine drag-torque control, but by the engine management program, which limits the maximum drag torque of the driving engine independently of the intervention of the engine drag-torque control.

* * * * *